US012624136B2

(12) United States Patent
Ma

(10) Patent No.: US 12,624,136 B2
(45) Date of Patent: May 12, 2026

(54) PHTHALATE-FREE POLYPROPYLENE HOMOPOLYMER HAVING HIGH STIFFNESS PROPERTIES

(71) Applicant: W.R. Grace & Co.-Conn., Columbia, MD (US)

(72) Inventor: Zhiru Ma, Ellicott City, MD (US)

(73) Assignee: W.R. Grace & Co.- Conn, Columbia, MD (US)

( * ) Notice: Subject to any disclaimer, the term of this patent is extended or adjusted under 35 U.S.C. 154(b) by 709 days.

(21) Appl. No.: 18/011,701

(22) PCT Filed: Jun. 29, 2021

(86) PCT No.: PCT/US2021/039558
§ 371 (c)(1),
(2) Date: Dec. 20, 2022

(87) PCT Pub. No.: WO2022/006072
PCT Pub. Date: Jan. 6, 2022

(65) Prior Publication Data

US 2023/0312782 A1 Oct. 5, 2023

Related U.S. Application Data

(60) Provisional application No. 63/045,348, filed on Jun. 29, 2020.

(51) Int. Cl.
*C08F 110/06* (2006.01)
*C08J 3/12* (2006.01)
*C08L 23/12* (2006.01)

(52) U.S. Cl.
CPC ............... *C08F 110/06* (2013.01); *C08J 3/12* (2013.01); *C08L 23/12* (2013.01); *C08J 2323/12* (2013.01); *C08J 2423/12* (2013.01); *C08L 2205/025* (2013.01)

(58) Field of Classification Search
CPC ............ C08F 110/06; C08L 23/12; C08J 3/12
USPC .......................................................... 523/100
See application file for complete search history.

(56) References Cited

U.S. PATENT DOCUMENTS 5,674,630 A * 10/1997 Chatterjee ............... C08L 23/12 428/524
9,464,144 B2 10/2016 Gonzalez et al.
2004/0122196 A1 6/2004 Pierini et al.
2009/0208681 A1 8/2009 Ernst et al.
2010/0168353 A1* 7/2010 Sheard .................... C07C 37/56 526/191
2016/0071628 A1* 3/2016 Klimke .................. H01B 3/441 428/379
2019/0359746 A1* 11/2019 Standaert ................ C08L 23/10

FOREIGN PATENT DOCUMENTS

EP 1 883 659 B1 2/2008
WO WO-02/16455 A1 2/2002
WO WO 2010/078485 A1 7/2010
WO WO 2011/135005 A2 11/2011
WO WO-2014/195127 A1 12/2014
WO WO 2017/093169 A1 6/2017
WO WO 2018/059955 A1 4/2018
WO WO 2018/060406 A1 4/2018
WO WO 2018/060413 A1 4/2018
WO WO-2018/069541 A1 4/2018
WO WO 2018/122134 A1 7/2018
WO WO 2019/121701 A1 6/2019
WO WO 2019/121777 A1 6/2019

OTHER PUBLICATIONS https://www.specialchem.com/plastics/guide/strength-at-yield-tensile (Year: 2025).*
Extended European Search Report on EP Application No. 21832333.5 Dated Jul. 1, 2024 (10 pages).
International Preliminary Report on Patentability on PCT patent application No. PCT/US2021-039558 dated Jan. 12, 2023 (6 pages).
Translation of the Japanese Office Action for Application No. 2022-580463, dated Jun. 5, 2025, 8 pages.
Translation of the Russian Search Report for Application No. 2023101719, dated Dec. 12, 2024, 3 pages.
International Search Report and Written Opinion, PCT/US2021/039558 dated Oct. 6, 2021, 8 pages.

* cited by examiner

*Primary Examiner* — Deve V Hall
(74) *Attorney, Agent, or Firm* — Dority & Manning, P.A.

(57) ABSTRACT

Phthalate-free polypropylene homopolymers and compositions incorporating the homopolymers are described. The phthalate-free polypropylene homopolymers exhibit high molecular weight as well as low XS content. Composition incorporating the phthalate-free polypropylene homopolymer can have relatively high stiffness properties. In addition, the polypropylene compositions can have good melt flow characteristics. Phthalate-free compositions including the homopolymers can be advantageously utilized in forming containers and other articles in food contacting, medical, and personal care applications.

19 Claims, No Drawings

PHTHALATE-FREE POLYPROPYLENE HOMOPOLYMER HAVING HIGH STIFFNESS PROPERTIES

CROSS-REFERENCE TO RELATED APPLICATIONS

This application is a U.S. National Phase Application under 35 U.S.C. § 371 of International Application No. PCT/US2021/039558, filed Jun. 29, 2021, which claims priority to and the benefit of U.S. Provisional Patent application Ser. No. 63/045,348, filed on Jun. 29, 2020, both of which are hereby incorporated by reference in their entireties.

BACKGROUND

Polypropylene exhibits mechanical and thermal properties useful in a wide variety of applications. One significant mechanical property of polypropylene is stiffness. Stiffness refers to the rigidity characteristics of a material and can be measured by determining the flexural modulus of the material. Flexural modulus relates to the ability of the material to bend or, in other words, its resistance to bending when a force is applied perpendicular to a structure formed from the polymer. High stiffness polymers will resist deformation when subjected to exterior forces and thus are often utilized in forming freestanding and shape-retaining products.

In recent years, improvements in polymer formation techniques have been achieved that decrease the environmental impact of both the formation techniques and the polymers formed by the techniques. For instance, phthalate-free catalysts have been developed that can be used to produce phthalate-free polymers, i.e., polymers that carry with them no vestige of a phthalate-containing catalyst. Unfortunately, polymers, and particularly polypropylenes, that exhibit multiple different beneficial qualities, e.g., desirable mechanical characteristics such as stiffness in conjunction with desirable environmental qualities such as being phthalate-free while also maintaining desirable processability characteristics, have proven elusive.

In view of the above, a need exists for a phthalate-free polypropylene homopolymer that has relatively high stiffness properties and good processability characteristics. A need also exists for polypropylene polymer compositions incorporating such a polypropylene homopolymer.

SUMMARY

In general, the present disclosure is directed to a polypropylene homopolymer having desirable characteristics. In particular, the polypropylene homopolymer can be phthalate-free. In addition, the polypropylene homopolymer can exhibit both a high molecular weight and a low xylene solubles (XS) content. For instance, a polypropylene homopolymer can have a molecular weight of greater than about 150,000, such as greater than about 200,000, such as greater than about 250,000, such as greater than about 300,000, such as greater than about 350,000. A polypropylene homopolymer can have a xylene soluble content (XS) of about 1.8% by weight or less, such as about 1.5% by weight or less, such as about 1.3% by weight or less, or about 1% by weight or less.

Also disclosed is a composition including the phthalate-free polypropylene homopolymer having high stiffness and good processability properties. For instance, a composition including the phthalate-free polypropylene homopolymer as described herein can have a flexural modulus of about 1700 MPa or greater, for instance from about 1700 MPa to about 2100 MPa. A composition as described can have a melt flow rate of about 1 g/10 min or greater and about 10 g/10 min or less, for instance about 5 g/10 min or less, about 4.5 g/10 min or less, or about 4 g/10 min or less.

A composition including the polypropylene homopolymer can be used to form all different types of molded articles using any suitable thermoforming process or molding process. For example, articles can be produced using extrusion blow molding, injection molding, rotational molding, extrusion, and the like. The polypropylene homopolymer can also be used to produce biaxially oriented polypropylene films. Articles that may be made in accordance with the present disclosure include food contact articles, medical care articles, and personal care articles.

Other features and aspects of the present disclosure are discussed in greater detail below.

DEFINITIONS AND TESTING PROCEDURES

The term "phthalate-free propylene," as used herein, is a propylene polymer (either a homopolymer or a copolymer) that carries with it no vestige of a phthalate catalyst system, including any phthalate-containing components of a catalyst system and any phthalate decomposition products of a phthalate catalyst system. Similarly, a composition including a phthalate-free polypropylene can be a phthalate-free composition and can be free of phthalate-containing components and phthalate decomposition products.

The term "polypropylene homopolymer," as used herein, is a homopolymer containing propylene monomer units.

The term "propylene copolymer", as used herein, is a copolymer containing a weight percent propylene monomer with a different monomer, e.g., an ethylene monomer, as a secondary constituent. A "propylene-ethylene copolymer" (also sometimes referred to as a polypropylene random copolymer, PPR, PP-R, RCP or RACO) is a polymer having individual repeating units of an ethylene monomer present in a random or statistical distribution in the polymer chain.

Melt flow rate (MFR), as used herein, is determined in accordance with the ASTM D 1238 test method at 230° C. with a 2.16 kg weight for propylene-based polymers.

Xylene solubles (XS) is defined as the weight percent of resin that remains in solution after a sample of polypropylene is dissolved in hot xylene and the solution is allowed to cool to 25° C. The XS content is determined according to the gravimetric XS method according to ASTM D5492-06 (also referred to herein as the "wet method") using a 90 minute precipitation time.

In general, the procedure includes of weighing 2 g of sample and dissolving the sample in 200 ml o-xylene in a 400 ml flask with 24/40 joint. The flask is connected to a water-cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=[($m_3$−$m_2$)*2/$m_1$]*100, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

Flexural modulus is determined in accordance with ASTM D790-10 Method A at 1.3 mm/min, using a Type 1 specimen per ASTM 3641 and molded according to ASTM D4101.

IZOD impact strength is determined in accordance with ASTM D 256 and D4101.

Tensile strength at yield is determined in accordance with ASTM D638.

Mw/Mn (also referred to as "MWD") and Mz/Mw are measured by GPC according to the Gel Permeation Chromatography (GPC) Analytical Method for Polypropylene. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing "200 ppm 2,6-di-t-butyl-4-methylphenol (BHT). The flow rate is 1.0 mL/min and the injection volume was 200 μl. A 2 mg/mL sample concentration is prepared by dissolving the sample in N2 purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 gin 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic/molecular weight calibration is generated using a fourth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym, Scl., 29, 3763-3782 (1984)) and polystyrene(E. P, Otocka, R. J. Roe, N. Y. Hellman, P. M. Mugha, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

where $M_{pp}$ is polypropylene (PP) equivalent MW, $M_{PS}$ is polystyrene (PS) equivalent MW, log K and a values of Mark-Houwink coefficients for PP and PS are listed below in Table 1.

TABLE 1

| Polymer | A | Log K |
|---|---|---|
| Polypropylene | 0.725 | −3.721 |
| Polystyrene | 0.702 | −3.900 |

Tacticity characteristics, which describe the relative stereochemistry of adjacent chiral centers within in a macromolecule or polymer, is determined by $^{13}$C NMR, for instance as described in Macromolecules 8 687 (1975) and in Macromolecules 6 925 (1973) and references cited therein. The tacticity descriptions herein utilize standard characterizations as are known in the art. Two contiguous monomer units, a "diad," having the same configuration is isotactic or meso (m). When the diad monomer units have opposite configuration, the diad is racemic (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. For five contiguous monomer units, a "pentad," there are ten possibilities. A completely syndiotactic polymer would have all rrrr pentads while a completely isotactic polymer would have all mmmm pentads.

The tacticity of the polypropylene homopolymer can be described or quantified by referring to isotactic triad concentration (mm %), isotactic pentad concentration (mmmm %), isotactic block length (Liso), meso run length (Nm), etc., or any combination thereof. Liso and Nm are determined according to the following relationships:

Liso=(2*mmmm/mmrr)+3,

Nm=((mm+(mr/2))/mr, where mr=(mr+rm)/2

Samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block. Each sample is visually inspected to ensure homogeneity.

The data are collected using a Bruker 400 MHz spectrometer equipped with a Bruker Dual DUL high-temperature CryoProbe. The data are acquired using 512 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 10 minutes prior to data acquisition. Tacticity characteristics are calculated from the data according to methods commonly used in the art.

Thermal characteristics, including crystallization temperature ($T_c$) and melting temperature ($T_m$) are determined by DSC analysis according to ISO 11357.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a phthalate-free polypropylene homopolymer and compositions incorporating the homopolymer having a unique blend of desirable properties. For instance, the phthalate-free polypropylene homopolymer can exhibit desirable molecular weight distribution as well as excellent XS properties. A composition incorporating the polypropylene homopolymer can have relatively high stiffness properties. In addition, the polypropylene composition can be formulated to have good processing characteristics, e.g., good melt flow characteristics. Thus, the polypropylene homopolymer is particularly well suited to form products and in particular molded articles, such as injection molded articles. Due to the desirable properties of the polypropylene homopolymer and compositions containing the homopolymer, containers and other articles having an interior volume can be formed with minimal wall thickness. In this manner, polymer articles can be formed efficiently using minimal amounts of the polypropylene homopolymer.

Of particular advantage, the polypropylene homopolymer can be polymerized using a phthalate-free catalyst system and a composition containing the phthalate-free polypropylene homopolymer can exhibit high stiffness properties and excellent processability. As such, the composition can be a phthalate-free polymer composition and can be well-suited for use in forming phthalate-free molded products, such as food contact products including food containers as well as medical care articles, personal care articles, etc. Moreover, a phthalate-free catalyst system exhibiting high activity can be utilized in forming the polypropylene homopolymer. For example, during polymerization of the polymers of the present disclosure, a non-phthalate, Ziegler-Natta catalyst can be used that maintains an activity of greater than about 50 kg/g, such as greater than about 55 kg/g, such as greater than about 60 kg/g during production of the polypropylene homopolymer, such as even greater than about 65 kg/g in some embodiments. The catalyst activity is generally less than about 100 kg/g.

The xylene soluble content (XS) of the polypropylene homopolymer can be relatively low, such as about 1.8% by weight or less. For example, the polypropylene homopolymer can have an XS of from about 0.5% by weight to about 1.8% by weight, such as from about 0.7% by weight to about 1.5% by weight, such as from about 0.8% by weight to about 1.2% by weight.

In combination with the low XS content, the polypropylene homopolymer can also have a high molecular weight. For instance, the polypropylene homopolymer can have a weight average molecular weight (MVV) of greater than about 150,000, such as greater than about 200,000, such as greater than about 250,000, such as greater than about 300,000, such as greater than about 350,000, for instance from about 150,000 to about 450,000, or even greater in some embodiments.

The polypropylene homopolymer can have a relatively broad molecular weight distribution, which can significantly improve the processability of the homopolymer. In one embodiment, the polypropylene homopolymer has a molecular weight distribution of greater than about 5, such as greater than about 5.5, such as greater than about 6, and generally less than about 10, such as less than about 8.5, such as less than about 7.

The polypropylene homopolymer of the present disclosure can be highly isotactic. For instance, the polypropylene homopolymer can have an isotactic pentad content (mmmm %) of about 95% or greater and an isotactic triad content (mm %) of about 97% or greater. The isotactic block length (Liso) can be greater than about 150, such as greater than about 160, such as greater than about 170, such as greater than about 175. The isotactic block length is generally less than about 200. The meso run length (Nm) can generally be greater than about 100, such as greater than about 110, such as greater than about 115. The meso run length is generally less than about 150, such as less than about 140.

The polypropylene homopolymer can also exhibit desirable thermal characteristics. For instance, the melting temperature of the polypropylene homopolymer of the present disclosure can be greater than about 160° C., such as greater than about 164° C., and the crystallization temperature can be greater than about 120° C., such as greater than about 125° C., such as greater than about 126°.

As stated, a composition incorporating the polypropylene homopolymer can have excellent stiffness characteristics. For example, in one embodiment, a composition incorporating the polypropylene homopolymer of the present disclosure can have a flexural modulus of greater than about 1700 MPa, such as greater than about 1750 MPa, such as greater than about 1800 MPa, such as greater than about 1850 MPa, such as greater than about 1900 MPa, such as greater than about 1950 MPa, and generally less than about 2500 MPa, such as less than about 2100 MPa, such as less than about 2050 MPa. For example, in one embodiment, a composition incorporating the polypropylene homopolymer can have a flexural modulus of greater than about 1700 MPa and less than about 2100 MPa, including all increments of 25 MPa therebetween.

In addition to other excellent properties, a composition incorporating the polypropylene homopolymer of the present disclosure exhibits excellent processability characteristics. A composition incorporating the polypropylene homopolymer, for instance, can have a melt flow rate of less than about 5 g/10 min, such as less than about 4 g/10 min, such as less than about 3 g/10 min, such as less than about 2 g/10 min, such as less than about 1 g/10 min, and generally greater than about 0.01 g/10 min, such as greater than about 0.1 g/10 min, such as greater than about 0.5 g/10 min.

A composition incorporating the polypropylene homopolymer of the present disclosure also has excellent mechanical characteristics in addition to the excellent stiffness characteristics. For instance, the polypropylene homopolymer can have an Izod impact strength of greater than about 10 J/m, such as greater than about 15 J/m, such as greater than about 20 J/m. The IZOD impact resistance strength is generally less than about 80 J/m, such as less than about 70 J/m, such as less than about 60 J/m. In addition, the polypropylene homopolymer can have a tensile strength at yield of greater than about 20 MPa, such as greater than about 25 MPa, such as greater than about 30 MPa, such as greater than about 35 MPa. The tensile strength at yield is generally less than about 60 MPa, such as less than about 50 MPa, such as less than about 45 MPa.

The polypropylene homopolymer can be formed using phthalate-free catalyst system. For instance, the polypropylene homopolymer can be formed using a phthalate-free Ziegler-Natta catalyst that maintains high catalyst activity during polymerization as discussed previously. In one embodiment, the polymerization can occur in the presence of a phthalate-free catalyst system that includes a catalyst, an internal electron donor, a cocatalyst, and optionally an external electron donor and/or various other components such as an activity limiting agent.

In one embodiment of the present disclosure, the polymerization is carried out in the presence of a stereoregular olefin polymerization catalyst. For instance, in one embodiment, a phthalate-free catalyst sold under the trade name CONSISTA® and commercially available from W. R. Grace & Company can be used. In addition, electron donors can be selected that do not contain phthalates.

In one embodiment, the catalyst includes a procatalyst composition that contains a titanium moiety such as titanium chloride, a magnesium moiety such as magnesium chloride, and at least one internal electron donor.

The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In one embodiment, the procatalyst precursor contains magnesium as the sole metal component. Non-limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In one embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical $MgCl_2$-nEtOH adduct may be formed by a spray crystallization process. In one, embodiment the spherical $MgCl_2$ precursor has an average particle size (Malvern $d_{50}$) of between about 15-150 microns, preferably between 20-100 microns, and most preferably between 35-85 microns.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof In one embodiment, the precursor composition is a mixed magnesium/titanium compound of the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3.

In accordance with the present disclosure, the above described procatalyst precursor is combined with at least one internal electron donor. The internal electron donor can comprise a phthalate-free substituted phenylene aromatic diester.

In one embodiment, the first internal electron donor comprises a substituted phenylene aromatic diester having the following structure (I):

(I)

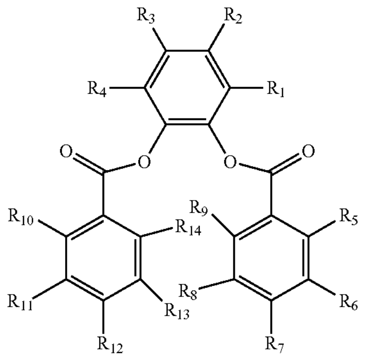

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Publication Nos. 2010/0168342, 2010/0168353, 2010/0173769, 2010/0174105, 2010/0197874, 2010/0204506, and 2020/0301059, all of which being filed on Dec. 31, 2009, and all of which claiming filing benefit of U.S. Patent Application Ser. No. 61/141,959 filed on Dec. 31, 2008, the entire content of all of which are incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a C5 or a C6 membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a C5 or a C6-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a C1-C8 alkyl group, a C3-C6 cycloalkyl, or a substituted C3-C6 cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a C1-C8 alkyl group, a C3-C6 cycloalkyl group, or a substituted C3-C6 cycloalkyl group. $R_5$-$R_{14}$ are the same or different and each of $R_5$-$R_{14}$ is selected from hydrogen, a C1-C8 alkyl group, and a halogen. Nonlimiting examples of suitable C1-C8 alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable C3-C6 cycloalkyl groups include cyclopentyl and cyclohexyl groups. In a further embodiment, at least one of $R_5$-$R_{14}$ is a C1-C8 alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

(II)

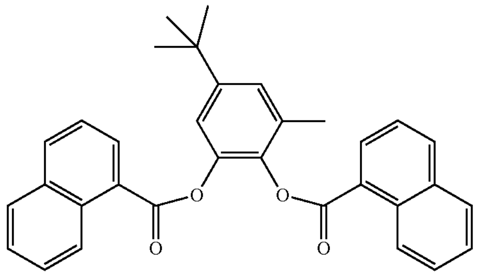

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

(III)

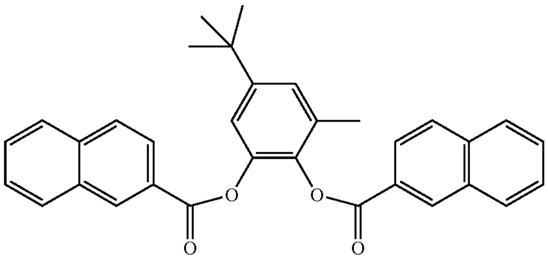

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In one embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In one embodiment, structure (I) includes $R_1$ that is a methyl group and $R_3$ is a t-butyl group. Each of $R_2$, $R_4$ and $R_5$-$R_{14}$ is a fluorine atom.

In one embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$ and $R_{14}$ is hydrogen.

In one embodiment, $R_1$ is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In one embodiment, structure (I) includes $R_1$ and $R_3$, each of which is a sec-butyl group. Each of $R_2$, $R_4$ and $R_5$-$R_{14}$ is hydrogen.

In one embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

(IV)

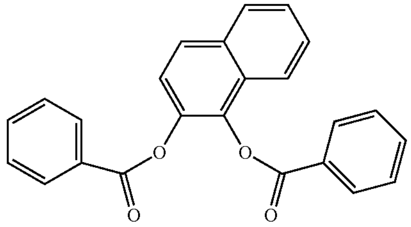

In one embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

(V)

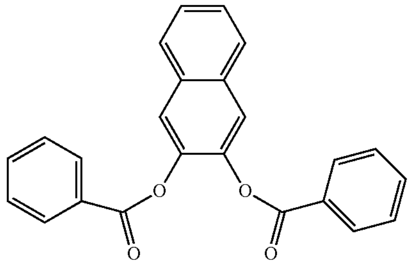

In one embodiment, structure (I) includes $R_1$ and $R_4$ that are each a methyl group. Each of $R_2$, $R_3$, $R_5$-$R_9$ and $R_{10}$-$R_{14}$ is hydrogen.

In one embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In one embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In one embodiment, each of $R_1$ and $R_4$ is selected from a methyl group, an ethyl group, and a vinyl group. Each of $R_2$ and $R_3$ is selected from hydrogen, a secondary alkyl group, or a tertiary alkyl group, with $R_2$ and $R_3$ not concurrently being hydrogen. Stated differently, when $R_2$ is hydrogen, $R_3$ is not hydrogen (and vice versa).

In one embodiment, a second internal electron donor may be used that generally comprises a polyether that can coordinate in bidentate fashion. In one embodiment the second internal electron donor is a substituted 1,3-diether of structure VI:

(VI)

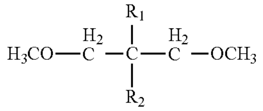

Where $R_1$ and $R_2$ are the same or different, methyl, C2-C18 linear or branched alkyls, C3-C18 cycloalkyl, C4-C18 cycloalkyl-alkyl, C4-C18 alkyl-cycloalkyl, phenyl, organosilicon, C7-C18 arylalkyl, or C7-C18 alkylaryl radicals; and $R_1$ or $R_2$ may also be a hydrogen atom.

In one embodiment the second internal electron donor may comprise a 1,3-diether with cyclic or polycyclic structure VII:

(VII)

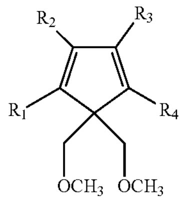

Where $R_1$, $R_2$, $R_3$, and $R_4$ are as described for $R_1$ and $R_2$ of structure VI or may be combined to form one or more C5-C7 fused aromatic or non-aromatic ring structures, optionally containing an N, O, or S heteroatom. Particular examples of the second internal electron donor include 4,4-bis (methoxymethyl)-2,6-dimethyl heptane, 9,9-bis(methoxymethyl)fluorene, or mixtures thereof.

During formation, the precursor is converted to a solid procatalyst by further reaction (halogenation) with an inorganic halide compound, preferably a titanium halide compound, and incorporation of the internal electron donors.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The internal electron donor can be present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donor is generally present in an amount greater than about 5% by weight, such as in an amount greater than about 9% by weight.

In one embodiment, the procatalyst composition is combined with a cocatalyst to form a phthalate-free catalyst system. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, and as such reduces xylene soluble material in the formed polymer.

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_1$-4 alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-14}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane (DCPDMS), methylcyclohexyldimethoxysilane (MChDMS), diisopropyldimethoxysilane (DI PDMS), n-propyltrimethoxysilane (NPTMS), diethylaminotriethoxysilane (DATES), or n-propyltriethoxysilane (PTES), and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, and/or a diol ester. In another embodiment, the external electron donor is 2,2,6,6-tetramethylpiperidine. In still another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono-or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane, isopropyl myristate, pentyl valerate, and combinations thereof.

In one embodiment, the catalyst composition includes any of the foregoing external electron donors in combination with any of the foregoing activity limiting agents.

The polymerization process used to produce the polypropylene homopolymer can be carried out using known reactor systems. For instance, the polymer can be formed in a gas phase reactor or a bulk (liquid) phase reactor. In particular, the polymer can be formed in a gas phase reactor using a fluidized bed or stirred bed reactor or in a slurry phase using an inert hydrocarbon solvent or diluent or liquid monomer.

In one embodiment, the polypropylene homopolymer can be formed in a gas phase reactor system such as that described previously, for instance in U. S. Pat. No. 8,324,327 to Cai, et al. and having a filing date of Aug. 21, 2008 or in U.S. Pat. No. 10,093,759 to Cai, et al. and having a filing date of Nov. 21, 2014, the entire content of both of which are incorporated by reference herein.

For instance, a gas phase polymerization process can include a fluidized bed that includes a plurality of polymer particles suspended in the fluidized bed by a stream of a fluidizing medium. In an embodiment, the fluidizing medium includes propylene gas and a carrier gas such as hydrogen or nitrogen. A typical gas-phase polymerization reactor (also referred to as a gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone.

Many operational parameters are monitored and controlled during gas-phase polymerization. One parameter is fluidized bulk density. The "fluidized bulk density" (or "FBD") is the weight of solid (i.e., polymer particles) per unit volume in the fluidized bed. FBD is a mean value which may be greater or less than the localized bulk density at any point in the fixed reactor portion. In one embodiment, a polypropylene homopolymer formation process can utilize a fluidized bed with an FBD from about 16 $kg/m^3$ (1 $lb/ft^3$) to about 640 $kg/m^3$ (40 $lb/ft^3$), or from about 112 $kg/m^3$ (7 $lb/ft^3$) to about 640 $kg/m^3$ (40 $lb/ft^3$) or from about 112 $kg/m^3$ (7 $lb/ft^3$) to about 560 $kg/m^3$ (35 $lb/ft^3$).

The catalyst is typically fed into a lower section of the reactor. Reaction occurs upon contact between the catalyst and the fluidizing medium yielding growing polymer particles. The catalyst may be added as a solid, a slurry or a solution, and may be supported on an inorganic or an organic support. The catalyst may be conveyed into the reactor with a gas, liquid or gas/liquid mixture including for example gaseous nitrogen, cycle gas and propane, or liquid propane, propylene, isopentane and liquified cycle gas condensed in the recirculation loop. The catalyst may be introduced into the reactor alone or in combination with the fluidizing medium.

The fluidizing medium passes upward through the fluidized bed, providing a medium for heat transfer and fluidization. The reactor in one embodiment includes an expanded section located above the reaction section. In the expanded section, particles having a terminal velocity higher than the velocity of the fluidizing medium disentrain from the fluidizing medium stream. After leaving the reactor, the fluidizing medium passes through a compressor and one or more heat exchangers to remove the heat of polymerization before it is re-introduced into the reaction section of the reactor. The fluidizing medium may or may not contain an amount of liquid after cooling and condensing.

Gas-phase polymerization requires that the velocity of the fluidizing medium be sufficient to maintain the bed of polymer particles in a fluidized state. In an embodiment, the fluidizing medium flows or otherwise passes through the bed at a velocity from about 0.24 m/second (0.8 ft/second) to about 1.52 m/second (5.0 ft/second).

As stated, the fluidizing medium contains propylene gas a carrier gas that can be, for example, hydrogen and/or nitrogen gas. In one embodiment, the fluidizing medium has a gas density from about 40 kg/$m^3$ (2.5 lb/$ft^3$) to about 80 kg/$m^3$ (5.0 lb/$ft^3$). The propylene gas can have a partial pressure from about 2.07 MPa-absolute (300 psia) to about 2.76 MPa-absolute (400 psia). The polymerization process can include maintaining (some or all of) the fluidized bed in at least the turbulent regime while decreasing a propylene partial pressure of the fluidizing medium. Decreasing the propylene partial pressure causes a decrease in the density of the fluidizing medium and increase in the bulk density of the fluidized bed.

The polymerization process includes introducing a phthalate-free catalyst system into the reactor to form polymer particles which compose the fluidized bed. For instance, the product polymer particles in one embodiment have an average particle sized (APS) from about 0.36 mm (0.014 inches) to about 3.05 mm (0.12 inches), or from about 0.46 mm (0.018 inches) to about 0.76 mm (0.03 inches). In another embodiment, the product polymer particles have a settled bulk density (SBD) from about 240 kg/$m^3$ (15 lb/$ft^3$) to about 560 kg/$m^3$ (35 lb/$ft^3$). On-line determination of the flow and fill characteristics of the reactor can be utilized with or without historical data to determine a discharge cycle time period. In general, a polymerization process can produce product particles comprising the phthalate-free polypropylene homopolymer with a residence time of from about 0.2 to about 5 hours, for instance 0.5 hour to about 2 hours. In one embodiment, a formation process can produce the polypropylene homopolymer at a rate from about 28000 kg/hr (28 tons/hour) to about 40000 kg/hr (40 tons/hour), or from about 30000 kg/hr (30 tons/hour) to about 35000 kg/hr (35 tons/hr), or about 33000 kg/hr (33 tons/hour).

A polypropylene polymer composition of the present disclosure can include the polypropylene homopolymer in conjunction with various residual polymer formation components or other additives. For instance, a polypropylene composition can contain nucleators, clarifying agents, mold release agents, slip agents, antiblocks, UV stabilizers, heat stabilizer, colorants/tints, antioxidants (e.g., a hindered phenolic antioxidant), an acid scavenger, and the like. Each of the additives can be present in a polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

For example, in one embodiment, a polymer composition can contain a nucleating agent. The nucleating agent when present can generally be present in an amount greater than about 0.001% by weight and generally in an amount less than about 1% by weight, such as in an amount less than about 0.5% by weight, such as in an amount less than about 0.3% by weight.

When utilized, the nucleating agent is not particularly limited. In one embodiment, the nucleating agent may be selected from the group of phosphorous based nucleating agents like phosphoric acid esters metal salts represented by the following structure (VIII).

(VIII)

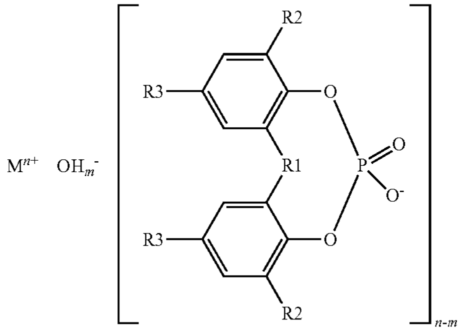

wherein R1 is oxygen, sulfur ora hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Examples of alpha nucleating agents represented by the above formula include sodium-2,2'-methylene-bis(4,6-di-t-butyl-phenyl)phosphate, sodium-2,2'-ethylidene-bis(4,6-di-t-butylphenyl)-phos-phate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl) phosphate], magnesium-bis[2,2'-thiobis(4-t-octylphenyl) phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phosphate, calcium-bis[2,2'-methylene-bis(4,6-di-t-butylphenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methylene-bis(4-ethyl-6-t-butylphenyl)phosphate, sodium(4,4'-dimethyl-5,6'-di-t-butyl-2,2'-biphenyl) phosphate, calcium-bis-[(4,4'-dimethyl-6,6'-di-t-butyl-2,2'-biphenyl)phosphate], sodium-2,2'-ethyli-dene-bis(4-m-butyl-6-t-butyl-phenyl)phosphate, sodium-2,2'-methylene-bis-(4,6-di-methylphenyl)-phos-phate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phosphate], magnesium-bis[2,2'-ethyli-dene-bis(4,6-di-t-butylphenyl)-phosphate], barium-bis[2,2'-ethylidene-bis-(4,6-di-t-butylphenyl)-phosphate], aluminium-hydroxy-bis[2,2'-methylene-bis(4,6-di-t-butyl-phenyl)phosphate], aluminium-tris[2,2'-ethylidene-bis(4,6-di-t-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Other examples of nucleating agents can include, without limitation, sorbitol-based nucleating agents (e.g., 1,3:2,4 Dibenzylidene sorbitol, 1,3:2,4 Di(methylbenzylidene) sorbitol, 1,3:2,4 Di(ethylbenzylidene) sorbitol, 1,3:2,4 Bis(3,4-dimethylbenzylidene) sorbitol, etc.), pine rosin, polymeric nucleating agents (e.g., vinylcycloalkane polymers, vinylalkane polymers, partial metal salts of a rosinic acid, etc.), talc, sodium benzoate, etc.

Commercially available examples of nucleating agents can include, without limitation, ADK NA-11, ADK NA-21, ADK NA-21 E, ADK NA-21 F, and ADK NA-27 which are available from Asahi Denka Kokai; Millad NX8000, Millad 3988, Millad 3905, Millad 3940, Hyperform HPN-68L, Hyperform HPN-715, and Hyperform HPN-20E, which are available from Milliken & Company; and Irgaclear XT 386 from Ciba Specialty Chemicals.

In one embodiment, the polypropylene composition can further contain a clarifying agent. The clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in structure (IX):

(IX)

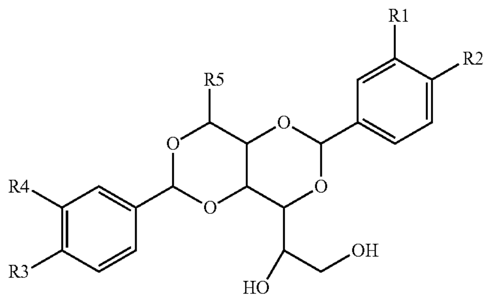

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups ($-CH_2-CH_2-CH_3$), and R1 and R4 are hydrogen, such that the sorbitol acetal derivative is 1,2,3-trideoxy-4,6:5,7-bis-O-(4-propylphenyl methylene) nonitol ("TBPMN").

Other examples of clarifying agents that may be used include, without limitation, 1,3:2,4-dibenzylidene sorbitol, 1,3:2,4-bis(p-methylbenzylidene) sorbitol, di(p-methylbenzylidene) sorbitol, di(p-ethylbenzylidene) sorbitol, bis(5', 6', 7', 8'-tetrahydro-2-naphtylidene) sorbitol, a bisamide, such as benzenetrisamide, as well as any combination of clarifying agents.

When present in the polymer composition, one or more clarifying agents are generally added in an amount greater than about 200 ppm, such as in an amount greater than about 1,800 ppm, such as in an amount greater than about 2,000 ppm, such as in an amount greater than about 2,200 ppm. One or more clarifying agents are generally present in an amount less than about 20,000 ppm, such as less than about 15,000 ppm, such as less than about 10,000 ppm, such as less than about 8,000 ppm, such as less than about 5,000 ppm. The amount of clarifying agent present in the composition can depend upon various factors including the type of clarifier that is used.

In an embodiment a polypropylene composition of the present disclosure includes a blend of polymers. More particularly, a polymer composition in an embodiment includes the polypropylene homopolymer disclosed herein combined with a second polymer.

The second polymer can, in one embodiment, be a polypropylene polymer. For instance, the first polymer and the second polymer can both be polypropylene homopolymers. In an alternative embodiment, the second polymer can be a polypropylene copolymer. For instance, the second polymer can be a polypropylene copolymer that can include minor amounts of a comonomer, such as ethylene. For instance, ethylene can be present in amounts less than about 1.5% by weight, such as in amounts less than 1% by weight. The copolymer can be a random copolymer such as a mini-random copolymer.

Other polymers can be blended with the polypropylene homopolymer in formation of a polymer composition, including other polypropylene copolymers. For instance, the second copolymer can be a propylene/ethylene copolymer that includes the ethylene comonomer in greater amounts, such as up to about 50% by weight. For example, the second copolymer can include an ethylene component in an amount of from about 1.5% by weight to about 48% by weight, such as from about 5% by weight to about 45% by weight, such as from about 10% by weight to about 40% by weight, such as from about 15% by weight to about 30% by weight. In some embodiments, the second polymer can include, without limitation, ethylene/alpha-olefin copolymers and terpolymers and block copolymers, ethylene-propylene diene rubbers, propylene-alpha olefin copolymers, silicon rubbers, butadiene-based rubber and the like.

In one embodiment, the first polypropylene homopolymer is blended with the second polymer to produce the polypropylene polymer composition. The weight ratio between the first propylene homopolymer and the second polymer in the final composition is generally from about 5:95 to about 80:20.

The second polymer can be a phthalate-free polymer. For instance, the second polymer can be a polypropylene polymer that can be formed from a phthalate-free catalyst system as described above. The propylene polymers can be formed from the same non-phthalate, Ziegler-Natta catalyst system or can be made from different non-phthalate, Ziegler-Natta catalyst systems. In accordance with the present disclosure, the two different polypropylene polymers are then combined.

In one embodiment, the first polypropylene homopolymer and the second polypropylene polymer are produced in two different polymerization processes and then combined together. Alternatively, the first polypropylene homopolymer and the second polypropylene polymer can be produced sequentially in a process that includes a series of reactors. For example, one of the polypropylene polymers can be produced in a first reactor and then conveyed to a second reactor where the other polypropylene polymer is produced.

A composition including the polypropylene homopolymer of the present disclosure is well suited to producing molded articles. A polypropylene composition including the polypropylene homopolymer, for instance, can be used in injection molding, blow molding, extrusion, and rotational molding applications.

A composition including the polypropylene homopolymer of the present disclosure can be used to make numerous and diverse articles and products. Due to the high stiffness properties and excellent flow properties, for instance, the polypropylene polymer composition can be used to produce all different types of freestanding articles and products. The high stiffness properties allow for articles to be produced having relatively thin walls while still having desired form-retaining properties. In addition, the high stiffness and toughness properties allow for products and articles made according to the present disclosure to withstand impact forces that may occur from drops or other external events.

Due to the phthalate-free characteristics of the polypropylene homopolymer of the present disclosure, the homopolymer is particularly well suited for making numerous articles and products that contact people including, without limitation, medical, personal care, and food contact articles and products.

The polypropylene polymer composition of the present disclosure, for instance, is well suited to producing all different types of containers while minimizing wall thickness and therefore minimizing the amount of polymer needed to produce the article. Containers that may be made in accordance with the present disclosure include, for instance, storage containers, packaging containers, food containers, and the like. Other containers can include cups and other beverage or liquid holding containers.

The present disclosure may be better understood with reference to the following example.

EXAMPLE

Various polypropylene homopolymers and homopolymer compositions were made in accordance with the present disclosure and tested for a variety of characteristics, including stiffness and processability. Samples 1-5 were compared to basic reactor grade polypropylene polymers produced with both phthalate catalysts and non-phthalate catalysts (Samples 6-10).

All samples included a polypropylene homopolymer. All of the Samples 1-5 polypropylene homopolymers were polymerized is a gas-phase reactor in the presence of a non-phthalate, Ziegler-Natta catalyst system as described above. In particular, the catalyst used was CONSISTA® catalyst marketed by W. R. Grace & Co. The Polymer pellet samples were produced that were injection molded into specimens. Samples 1-4 included addition of a nucleator to the polypropylene homopolymer including ADK NA-11 (Sample 1), NA-27 (Sample 2), HPN-715 (Sample 3), and HPN-20E (Sample 4). Samples 5-10 were non-nucleated. The samples were made according to ASTM Test D4101 to produce specimens for the various testing procedures as described previously.

The results are shown in Table 2

TABLE 2

| Sample No. | 1 | 2 | 3 | 4 | 5 | 6 | 7 | 8 | 9 | 10 |
|---|---|---|---|---|---|---|---|---|---|---|
| MFR (g/10 min) | 2.9 | 4.0 | 3.8 | 2.9 | 2.7 | 4.1 | 4.3 | 4.2 | 3.8 | 3.6 |
| XS (wt. %) | 0.9 | 0.9 | 0.9 | 1.0 | 1.0 | 2.5 | 3.4 | 2.5 | 5.2 | 4.4 |
| Additive (ppm) | 1000 | 1000 | 1000 | 500 | — | — | — | — | — | — |
| Flex-Mod (MPa) | 1974 | 2047 | 2023 | 1931 | 1741 | 1367 | 1491 | 1480 | 1267 | 1300 |
| Izod (J/m) | 33 | 21 | 32 | 50 | 47 | 45 | 41 | 41 | 37 | 35 |
| Tensile Str. At Yield (MPa) | 41 | 41 | 41 | 41 | 38 | 36 | 37 | 37 | 35 | 36 |
| $T_c$ (° C.) | 133 | 132 | 131 | 129 | 120 | 120 | 122 | 119 | 117 | 117 |
| $T_m$ (° C.) | 167 | 168 | 167 | 167 | 164 | 163 | 162 | 163 | 161 | 160 |
| mmmm % | 95.3 | 95.7 | 95.4 | 95.3 | 95.7 | 90.5 | 91.5 | 92.7 | 89.2 | 90.6 |
| mm % | 97.1 | 97.3 | 97.1 | 97.1 | 97.2 | 93.4 | 94.6 | 95.1 | 92.4 | 93.3 |
| Liso | 181.4 | 195.7 | 181.2 | 178.8 | 189.9 | 79.4 | 95.8 | 100.5 | 75.5 | 85.4 |
| Nm | 114.6 | 124.2 | 116.4 | 112.5 | 121.3 | 53.6 | 58.9 | 61.6 | 44.9 | 51.4 |
| $M_w$ | 400900 | 394300 | 402000 | 403700 | 397800 | 354800 | 338600 | 345300 | 405700 | 398400 |
| MWD | 6.0 | 6.0 | 6.0 | 6.0 | 6.1 | 5.5 | 7.5 | 7.0 | 8.7 | 8.2 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polypropylene homopolymer, wherein the polypropylene homopolymer has a weight average molecular weight of 150,000 or greater, a melting temperature of about 160° C. or greater, a molecular weight distribution of 5 or greater, and a xylene soluble content of 1.8% by weight or less, and wherein the polypropylene homopolymer is produced with a Ziegler-Natta catalyst and is phthalate-free.

2. The polypropylene homopolymer of claim 1, wherein the polypropylene homopolymer has an XS content of from 0.5% by weight to 1.5% by weight.

3. The polypropylene homopolymer of claim 1, wherein the polypropylene homopolymer has a weight average molecular weight of 200000 or greater.

4. The polypropylene homopolymer of claim 1, wherein the polypropylene homopolymer has a weight average molecular weight of 350000 or greater.

5. The polypropylene homopolymer of claim 1, wherein the polypropylene homopolymer has a molecular weight distribution of 5.5 or greater.

6. The polypropylene homopolymer of claim 1, wherein the polypropylene homopolymer has one or more of an isotactic pentad content of 95% or greater, an isotactic triad content of 97% or greater, an isotactic block length of 150 or greater, and a meso run length of 100 or greater.

7. The polypropylene homopolymer of claim 1, wherein the polypropylene homopolymer has a melting temperature of 164° C. or greater.

8. The polypropylene homopolymer of claim 1, wherein the polypropylene homopolymer has a crystallization temperature of 120° C.

9. The polypropylene homopolymer of claim 1, wherein the polypropylene homopolymer is formed in a gas phase reactor.

10. A composition comprising the phthalate-free polypropylene homopolymer of claim 1, wherein the composition has a flexural modulus of about 1700 MPa or greater, and a melt flow rate of about 1 g/10 min or greater and about 10 g/10 min or less.

11. The composition of claim 10, wherein the composition has an Izod impact strength of 10 J/m or greater.

12. The composition of claim 10, wherein the composition has a tensile strength at yield of 20 MPa or greater.

13. The composition of claim 10, wherein the composition comprises a nucleating agent.

14. The composition of claim 10, wherein the composition does not include a nucleating agent.

15. The composition of claim 10, wherein the composition comprises one or more of a mold release agent, a slip agent, an antiblock, a UV stabilizer, a heat stabilizer, a clarifying agent, an antioxidant, an acid scavenger, or a colorant.

16. The composition of claim 10, wherein the composition comprises a second polymer.

17. A molded article comprising the composition of claim 10.

18. The molded article of claim 17, wherein the molded article is a container.

19. The molded article of claim 17, wherein the molded article is a food contact article, a medical care article, or a personal care article.

* * * * *